US008475268B2

(12) United States Patent
O'Halloran et al.

(10) Patent No.: US 8,475,268 B2
(45) Date of Patent: Jul. 2, 2013

(54) LINEAR SCATTER JACKPOT METHOD AND SYSTEM

(75) Inventors: Terry O'Halloran, Bellevue Hill (AU); Andrew Masen, Kensington (AU)

(73) Assignee: SHFL Entertainment (Australasia) Pty Limited, Milperra, NSW (AU)

( * ) Notice: Subject to any disclaimer, the term of this patent is extended or adjusted under 35 U.S.C. 154(b) by 1723 days.

(21) Appl. No.: 10/591,310

(22) PCT Filed: Mar. 3, 2005

(86) PCT No.: PCT/AU2005/000304

§ 371 (c)(1), (2), (4) Date: May 7, 2007

(87) PCT Pub. No.: WO2005/086018

PCT Pub. Date: Sep. 15, 2005

(65) Prior Publication Data

US 2007/0281783 A1 Dec. 6, 2007

(30) Foreign Application Priority Data

Mar. 3, 2004 (AU) ................................ 2004901061

(51) Int. Cl.
*A63F 13/00* (2006.01)

(52) U.S. Cl.
USPC ................................................ 463/26; 463/20

(58) Field of Classification Search
USPC ................................................ 463/20, 21, 26
See application file for complete search history.

(56) References Cited

U.S. PATENT DOCUMENTS

| | | | | |
|---|---|---|---|---|
| 6,155,925 | A * | 12/2000 | Giobbi et al. | 463/20 |
| 6,159,096 | A * | 12/2000 | Yoseloff | 463/20 |
| 6,251,013 | B1 | 6/2001 | Bennett | 463/13 |
| 6,634,941 | B2 | 10/2003 | Olive | 463/16 |
| 2003/0064802 | A1 * | 4/2003 | Rodgers et al. | 463/30 |
| 2003/0216165 | A1 | 11/2003 | Singer et al. | 463/20 |
| 2003/0220134 | A1 * | 11/2003 | Walker et al. | 463/20 |
| 2003/0236116 | A1 * | 12/2003 | Marks et al. | 463/16 |
| 2004/0002373 | A1 * | 1/2004 | Kaminkow | 463/20 |
| 2004/0180714 | A1 * | 9/2004 | Ward | 463/20 |
| 2006/0019738 | A1 * | 1/2006 | Baerlocher et al. | 463/20 |

FOREIGN PATENT DOCUMENTS

| | | |
|---|---|---|
| CA | 2399931 | 8/2002 |
| EP | 1063622 | 5/2000 |
| WO | WO2005/086018 | 9/2005 |

* cited by examiner

*Primary Examiner* — Arthur O. Hall
*Assistant Examiner* — Allen Chan
(74) *Attorney, Agent, or Firm* — TraskBritt

(57) ABSTRACT

A method for awarding a jackpot, and a corresponding gaming machine and system. The jackpot is awarded based upon a presence of scatter symbols appearing in a game outcome in a predefined manner. The jackpot is preferably linked across multiple machines. In a preferred form, scatter symbols on one reel may be in an active or inactive state, the jackpot is awarded only if they are in the active state, and the probability of them being in an active state is dependent upon the size of the player's wager, so as to provide linear returns to players.

20 Claims, 1 Drawing Sheet

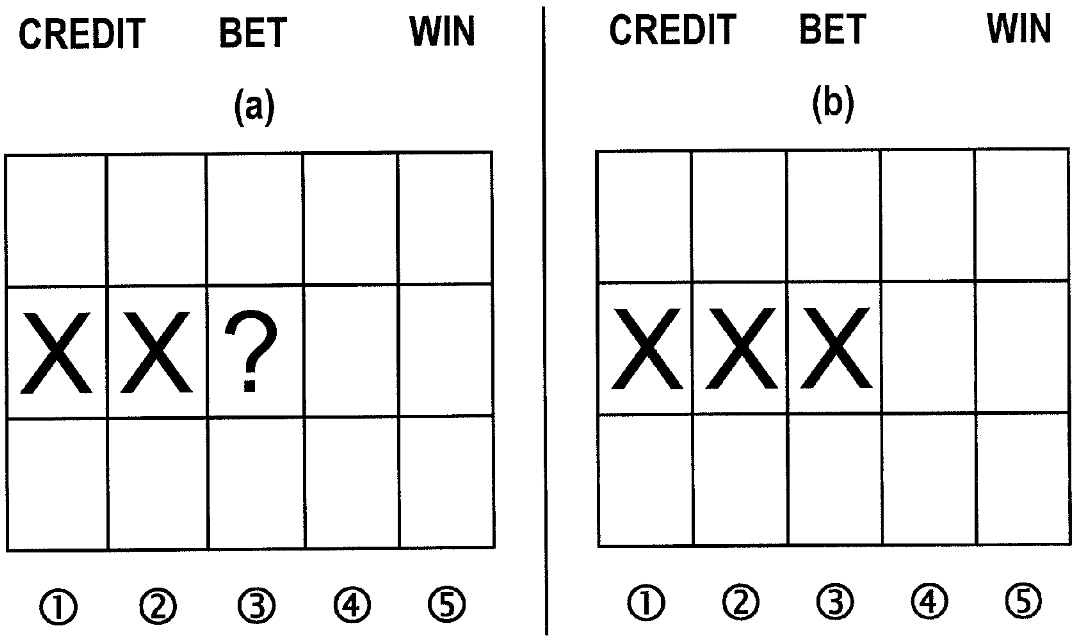
CREDIT
BET
WIN
(a)
X
X
?
①
②
③
④
⑤
CREDIT
BET
WIN
(b)
X
X
X
①
②
③
④
⑤

LINEAR SCATTER JACKPOT METHOD AND SYSTEM

CROSS-REFERENCE TO RELATED APPLICATIONS

This is a national phase entry under 35 U.S.C. §371 of International Patent Application PCT/AU2005/000304, filed Mar. 3, 2005, published in English as International Patent Publication WO 2005/086018 A1 on Sep. 15, 2005, which claims the benefit under Article 8 of the Patent Cooperation Treaty to Australian Patent Application Serial No. 2004901061, filed Mar. 3, 2004.

TECHNICAL FIELD

This invention relates to the provision of linear progressive jackpots triggered by scattered symbols on a gaming machine.

BACKGROUND

On many gaming machine systems, progressive jackpots are provided. Such a jackpot may be awarded to a player when the player achieves a particular combination of symbols, or the like, on the machine, or at a random time. The present invention is concerned with the former type. While such jackpots may be implemented on single machines, the common implementation of such a game uses a jackpot pooled across many machines, so that the jackpot is relatively large and is won at reasonable intervals.

The jackpot value in such linked games is generally incremented by a designated portion of each player's wager being added to the pool.

Current gaming regulations in many parts of the world require players to be paid returns in proportion to their bet level. For example, if a player plays a single line gaming machine at 1 credit, and achieves three "X" symbols on a line and a prize of 5 credits is awarded, then it would be expected that a player achieving the same result and playing 2 credits on the same single line game would be awarded 10 credits. This is referred to as "linearity," and ensures all players are paid prizes that are proportionate to their bet level. This feature may also be described as the probability of winning the jackpot being based upon the scatter symbols being linearly dependent upon the size of the player's wager relative to a maximum possible wager.

In the instance of progressive jackpots, all players are contributing to a common prize pool that can be won by any player at any time. A popular format to win a jackpot prize is called a symbol-driven link progressive jackpot. This format requires that a player must achieve a certain combination on the gaming screen to be awarded a prize or jackpot, or is given the chance to win a jackpot through a bonus game or similar game if they achieve this combination.

In order to meet regulations, any jackpot game must provide a linear chance of winning these jackpots. It is also a challenge to manufacturers to implement the game in such a way that game play is entertaining, as well as the jackpot appearing achievable to the player.

It is an object of the present invention to provide a new, symbol-driven jackpot system that is appealing to players and facilitates linear returns.

SUMMARY OF THE INVENTION

In a broad form, the present invention provides a method of providing a jackpot, in which the jackpot is triggered by symbols scattered across a screen of a gaming system and not confined to a payline.

According to one aspect, the present invention provides a method of providing a jackpot in a gaming machine, the gaming machine having multiple simulated reels and at least one payline, comprising at least the steps of:

(a) determining a player's wager;

(b) playing a game so that the multiple simulated reels assume a specific configuration; and (c) determining if scatter symbols appear across at least selected ones of the simulated reels in a predefined manner and, if so, then paying the jackpot.

The jackpot may be paid by paying in full a jackpot, either on a specific machine or across linked machines; paying part of a jackpot; or allowing the player to play a game that determines the quantum of any jackpot. The specification and claims should be read using this definition unless the context requires otherwise.

In a preferred form, the scatter, at least in part, is reliant upon symbols with an "active" and an "inactive" state. In the active state, these symbols act as part of the scatter to award the jackpot. Linearity is provided by making the probability that a symbol is "active," proportional to the size of the wager. In one form, this may be performed by having a different symbol, which only changes state after a reel is stationary.

As the probability that each symbol is active on the selected reel is independent of how many scatter symbols are present, this provides a simple, scalable way of ensuring linearity.

According to another aspect, the present invention provides a gaming machine having multiple simulated reels, the gaming machine including a processor, a player wager selection means, a display, and at least one payline, the processor playing a game in accordance with software, the game including the steps of:

(a) receiving a player's wager from the player wager selection means;

(b) playing the game so that the simulated reels are shown in a specific configuration on the display;

(c) determining if scatter symbols appear across the simulated reels in a predefined manner and, if so, then paying the jackpot.

While the present invention may be implemented on a single machine, it is preferably implemented as a linked jackpot arrangement. In a preferred form, each gaming machine determines the outcome of individual game play locally, while contributing incremental credits to a central system. The jackpot amount and payouts are managed by the central system. The system may accordingly be managed centrally in essentially the same way as a conventional symbol-driven jackpot system. The linked machines may be all on one site, or on linked sites, both of which are widely practiced for conventional linked jackpot systems.

As games and game types have evolved, different pay methods have been introduced to make the games more exciting. One of the most popular is the "scatter pay," which does not require paylines to reward a player. In a scatter game, an appearance of scatter symbols anywhere on a screen or in a predetermined directional pattern (left to right, right to left, adjacent) pays a prize multiplied by the player's total bet. The scatter feature is generally an addition to payline-based games. The present invention awards a jackpot, or the chance to win a jackpot, based on a scatter combination. This is a game feature that has not previously been used to award a jackpot.

One of the keys to devising linearity formats is to ensure players understand how they are potentially being rewarded. As scatter pay is now an accepted form of paying combination, this invention takes the simple scatter pay and adds another dimension that retains the existing method of awarding prizes, but introduces another element that is over and above the standard slot game.

BRIEF DESCRIPTION OF THE DRAWING

The present invention is described with reference to the accompanying FIG. 1, which is an illustration of relevant reel scatter symbols for an implementation of the present invention.

DETAILED DESCRIPTION

It will be understood that there are a variety of ways to implement the present invention. The present invention may be readily implemented as an additional feature on many existing slot machines, with appropriate modifications to the pay table to take account of incremental contributions to the jackpot. However, the invention will be principally described with reference to a specific implementation.

In this embodiment, the scatter symbol in question resides on reels 1, 2 and 3 of a five-reel game. The scatter symbol has an active and inactive position. While there are other potential embodiments based on disclosure in this example, the scatter symbols are always active on reels 1 and 2 for maximum exposure to the player. The scatter symbols on reel 3 are replaced by another symbol that, upon appearing on the completed position of the reels, reveals the scatter in an active or inactive position. The chance of revealing an active symbol is the player's wager divided by the maximum wager available.

The game may be configured in such a way that the base game prize for three "X" active symbols is the same as two "X" active symbols and an inactive symbol. The difference between the two is the player who gets the three active symbols wins a jackpot, or it provides them entry into a feature that will or may award a jackpot. This approach to implementing the invention allows the game to be designed with some mathematically unique and innovative devices that will streamline the game development process and make games more flexible.

First, the number of symbols that appear on reel 3 that is chosen to reveal the active or inactive position is not related to the number of possibilities available. If the maximum bet on a particular game is 500 credits, and the player bets 100 credits, then when the symbol lands on reel 3, it has a 20% chance (100/500) of being active when revealed. If that same game was changed to modify the maximum bet, the reel strips have no need to be modified as the designer may select between 1 and n symbols to appear on the reel depending on aesthetics, game presentation or other variables.

A second game design feature is that this can be developed in a range of formats on a standard slot reel game. While most games are designed in a standard 5×3 matrix, this implementation of the present invention can be readily implemented in any other format.

FIG. 1 is a representation of what the display on one slot machine would show when the game is being played. In this embodiment where the scatters appear on reels 1, 2 and 3, we have a situation in Bet (a) where active scatters appear on reels 1 and 2, and the symbol that will reveal active or inactive (designated by "?") appears on reel 3. While there are many implementations of how this may be presented to the player, our preferred embodiment is that the "?" symbol will be animated to reveal the active scatter symbol or the inactive scatter symbol. It will be appreciated that alternative implementations for the graphic elements are a matter of game designer choice.

The invention could similarly be implemented with, for example, an arrangement in which the symbol remains the same unless it becomes active, or in which the symbols appearing during the simulated reel spinning have already become active or inactive.

In Bet (b), the "?" symbol has changed state to the active X symbol, and the jackpot is awarded. It will be understood that although the illustration shows the X symbols all appearing on the central payline, they may equally be on the upper or lower positions on the same reel, as the jackpot is awarded for scattered symbols.

It will be understood that this implementation is merely illustrative. For example, there could be more or less reels with scatter symbols. The reels selected for the example are purely illustrative. The present invention can be readily added to existing games with modifications as required.

The term "reels" should be understood to include games in which symbols are arranged in different geometric patterns, with specific groups of symbols that move in a coordinated way being considered as reels.

It will be appreciated that the present invention is of broad application, and can be implemented in a variety of ways. Variations and additions are possible within the general scope of the present invention.

The invention claimed is:

1. A method of providing a jackpot in a gaming machine used to play a game, the method comprising using a processor to execute the steps of:

determining a player's wager;

playing the game so that reels of the gaming machine assume a specific configuration showing symbols across the reels used in the game, wherein one or more of the symbols is displayed as a variable state scatter symbol having either an active state or an inactive state when revealed on its position on the reels, the active state or the inactive state being determined according to a probability that is variable depending on the player's wager, wherein variable state scatter symbols displayed as having an inactive state are not considered for jackpot game play; and determining if scatter symbols displayed as having an active state appear across the reels used in the game in a predefined manner and, if so, then paying the jackpot.

2. The method of claim 1, wherein the probability of winning the jackpot based upon the scatter symbols is linearly dependent upon the size of the player's wager relative to a maximum possible wager.

3. The method of claim 1, wherein the variable state scatter symbols displayed as having an inactive state are considered for non-jackpot game play.

4. The method of claim 1, wherein the probability of a variable state scatter symbol being displayed as having an active state is dependent upon the size of the player's wager relative to a maximum possible wager.

5. The method of claim 1, wherein the jackpot is accumulated across a plurality of linked machines.

6. The method of claim 1, wherein the jackpot is accumulated on a single machine.

7. A method of awarding a jackpot in a reels gaming machine, comprising using a processor to execute the steps of:

generating a game outcome display for one or more reels used in the game, the game outcome display displaying scatter symbols on the one or more reels, the displayed scatter symbols being randomly selected from a set of symbols that are to be displayed at active positions and inactive positions of the one or more reels; and determining the jackpot being won by comparing scatter symbols at only active positions of the one or more reels in the game outcome display with a predetermined combination, wherein the probability that a position of the one or more reels is selected as an active position on the one or more reels in the game outcome display is dependent upon a size of the player's wager relative to a maximum possible wager for the reels gaming machine.

8. A system for operating a linked jackpot, comprising at least a plurality of gaming machines linked to a central jackpot controller, the central jackpot controller and the at least a plurality of gaming machines cooperating to implement the method of claim 1.

9. A gaming machine having multiple reels, the gaming machine including a processor, a player wager selection element, and a display having at least one payline, wherein the processor is programmed to play a game in accordance with software, the game including:

receiving a player's wager from the player wager selection element;

playing the game so that the multiple reels used in the game are displayed on the display in a specific configuration showing symbols across the multiple reels, wherein one or more of the symbols is a variable state scatter symbol being displayed as having either an active state or an inactive state when revealed at its corresponding location on the multiple reels, wherein the variable state scatter symbol in its active state is considered to be a scatter symbol for jackpot determining purposes, and wherein the variable state scatter symbol in its inactive state is not considered to be a scatter symbol for jackpot determining purposes, wherein a probability of a variable state scatter symbol having an active state is dependent upon a size of the player's wager; and determining if the symbols considered to be scatter symbols for jackpot determining purposes appear across the multiple reels in a predefined manner and, if so, then paying a jackpot.

10. The gaming machine of claim 9, wherein a probability of winning the jackpot based upon the scatter symbols is linearly dependent upon the size of the player's wager relative to a maximum possible wager.

11. The gaming machine of claim 9, wherein the variable state scatter symbol in its inactive state is considered to be a scatter symbol for a winning determination during non-jackpot game play.

12. The gaming machine of claim 9, wherein the probability of a variable state scatter symbol having an active state is dependent upon the size of the player's wager relative to a maximum possible wager.

13. The gaming machine of claim 9, further comprising a system for operating a linked jackpot game, and at least a plurality of gaming machines, the at least a plurality of gaming machines being linked to a central jackpot controller, the central jackpot controller and the at least a plurality of gaming machines cooperating to provide a pooled jackpot incremented from wagers on all of the at least a plurality of gaming machines.

14. A gaming machine having multiple reels used in a game, the gaming machine including a processor, a player wager selection element and a display, the processor programmed to play a game in accordance with software stored thereon, wherein the processor is programmed to indicate one or more reels used in the game to randomly display symbols having a fixed active state, and at least one reel to randomly display symbols having either an active state or inactive state according to a variable state probability, wherein a jackpot for the game is won by a predetermined combination of symbols from all reels that are displayed in a game outcome display to have an active state, wherein the variable state probability for having an active state on the game outcome display is dependent upon a size of a player's wager relative to a maximum possible wager for the gaming machine.

15. The method of claim 1, wherein the determination of the variable state scatter symbol being displayed as having either an active or an inactive state occurs during a display simulating spinning of the reels.

16. The method of claim 1, wherein at least some of the symbols are fixed state symbols that are displayed as only having an active state.

17. The method of claim 2, wherein the probability of revealing the variable state scatter symbol to be displayed as having an active state is equal to the player's wager divided by the maximum possible wager.

18. The gaming machine of claim 9, wherein one or more of the symbols is determined to only have an active state and considered to be a scatter symbol for jackpot determining purposes along with the variable state scatter symbols in their active states.

19. The gaming machine of claim 9, wherein a probability of a variable state scatter symbol having an active state is equal to the size of the player's wager divided by a size of a maximum possible wager.

20. The gaming machine of claim 14, wherein the variable state probability for having an active state on the game outcome display is proportional to the size of the player's wager divided by the maximum possible wager for the gaming machine.

* * * * *